(12) United States Patent
Nitschke et al.

(10) Patent No.: US 9,079,791 B2
(45) Date of Patent: Jul. 14, 2015

(54) SYSTEM AND METHOD FOR POSITIONING A HOT GLASS SHEET

(71) Applicant: GLASSTECH, INC., Perrysburg, OH (US)

(72) Inventors: David B. Nitschke, Perrysburg, OH (US); Dean M. Nitschke, Maumee, OH (US)

(73) Assignee: GLASSTECH, INC., Perrysburg, OH (US)

( * ) Notice: Subject to any disclaimer, the term of this patent is extended or adjusted under 35 U.S.C. 154(b) by 317 days.

(21) Appl. No.: 13/803,428

(22) Filed: Mar. 14, 2013

(65) Prior Publication Data
US 2014/0271058 A1 Sep. 18, 2014

(51) Int. Cl.
G06F 7/00 (2006.01)
C03B 23/03 (2006.01)
C03B 35/14 (2006.01)
C03B 35/16 (2006.01)

(52) U.S. Cl.
CPC .............. C03B 23/03 (2013.01); C03B 35/142 (2013.01); C03B 35/147 (2013.01); C03B 35/16 (2013.01); C03B 35/164 (2013.01); C03B 2225/02 (2013.01)

(58) Field of Classification Search
CPC ......... B65G 43/10; B65G 43/08; B65G 37/02
See application file for complete search history.

(56) References Cited

U.S. PATENT DOCUMENTS

| | | | |
|---|---|---|---|
| 1,196,761 A | 9/1916 | Clausen | |
| 1,967,761 A | 12/1930 | Von Reis | |
| 1,931,628 A | 10/1933 | Reis | |
| 2,559,319 A | 7/1951 | Robson | |
| 4,228,886 A | 10/1980 | Moran | |
| 4,282,026 A | 8/1981 | McMaster et al. | |
| 4,360,374 A | 11/1982 | Nitschke | |
| 4,493,412 A * | 1/1985 | Krehnovi | 198/434 |
| 4,666,493 A * | 5/1987 | Frank et al. | 65/29.12 |
| 4,838,920 A * | 6/1989 | Blasquez-Gonzales et al. | 65/104 |
| 4,976,766 A * | 12/1990 | Kuster et al. | 65/289 |
| 5,017,210 A * | 5/1991 | Petitcollin et al. | 65/106 |
| 7,712,334 B2 * | 5/2010 | Kanno et al. | 65/29.11 |
| 7,716,949 B2 * | 5/2010 | Bennett et al. | 65/29.12 |
| 7,900,477 B2 | 3/2011 | Kanno et al. | |
| 7,958,750 B2 | 6/2011 | Vild et al. | |
| 8,132,428 B2 | 3/2012 | Vild et al. | |

OTHER PUBLICATIONS

PCT Search Report and Written Opinion Dated Feb. 23, 2015, Application No. PCT/US14/16660, 10 Pages.

* cited by examiner

Primary Examiner — Gene Crawford
Assistant Examiner — Kyle Logan
(74) Attorney, Agent, or Firm — Brooks Kushman P.C.

(57) ABSTRACT

A system (10) and method for positioning a hot glass sheet G on a roll conveyor 24 for further processing utilizes sensors (60, 62, 64) for sensing a conveyed glass sheet position and a turntable (72) having an actuator (74) for providing axial shifting of rolls (26) supported on the turntable to properly locate the glass sheet G, without any sliding between the glass sheet and the conveyor rolls, both rotationally and laterally for further processing which is specifically disclosed as forming.

18 Claims, 5 Drawing Sheets

SYSTEM AND METHOD FOR POSITIONING A HOT GLASS SHEET

TECHNICAL FIELD

This invention relates to a system and a method for positioning a hot glass sheet for further processing.

BACKGROUND

Processing of glass sheets usually involves heating such as for forming from a flat shape to a curved shape. See, for example, U.S. Pat. No. 7,958,750 Vild et al. and U.S. Pat. No. 8,132,428 Vild et al. During such processing, it is important for the hot glass sheets after heating to be accurately positioned so that the forming can be performed to a design shape such as when forming on a mold by gravity or between a pair of molds for press bending, etc. When heating of glass sheets prior to the forming is performed within a furnace on a roll conveyor, the location of the glass sheet has previously been sensed by a sensor along the direction of conveyance. However, during the heating conveyance, the glass sheet can rotate about a vertical axis and migrate laterally with respect to the direction of conveyance so that the actual glass position is not determined by the sensor. The rotation and lateral migration of the glass sheet during the heating can result from wear of the conveyor components, and conductive heat that is supplied by the conveyor rolls to the bottom surface of the glass sheet during the conveyance so as to provide increased heating relative to its top surface in a manner that causes the glass sheet to bow upwardly into an upwardly concave shape. Such an upwardly concave shape of the glass sheet causes its contact with the conveyor rolls to be more centrally located rather than evenly over a full flat surface, which causes the rotation and lateral migration. Furthermore, paint which is usually black, at the periphery of the glass sheet on its upper surface for use in current production vehicle glass can absorb additional heat but only at the periphery so that, combined with the roll heating of the lower surface, the glass sheet assumes a saddle shape that also can result in rotation and lateral migration of the glass from its intended path of travel.

Accurate lateral positioning which can also provide rotational positioning on a roll conveyor is disclosed by U.S. Pat. No. 4,282,026 McMaster et al. and utilizes sliding of the glass sheet on the conveyor rolls. Movement of conveyor rolls along the direction of conveyance to permit an upper vacuum platen to receive a glass sheet being conveyed without any relative movement along the direction of conveyance during the transfer is disclosed by U.S. Pat. No. 4,360,374 Nitschke; however, this approach does not correct rotational or lateral positioning.

All of the above patents and references cited therein are hereby incorporated by reference.

SUMMARY

An object of the present invention is to provide an improved system for positioning a hot glass sheet on a roll conveyor.

In carrying out the above object, the system of the invention includes a roll conveyor for conveying the hot glass sheet and having horizontal rolls with associated rotational axes that extend parallel to each other and that are spaced from each other along a direction of conveyance. Sensors sense edge locations of the glass sheet during the conveyance of the glass sheet to generate signals corresponding to the rotational position, the location along the direction of conveyance, and the lateral location of the conveyed glass sheet with respect to the direction of conveyance. A rotatable turntable supports a plurality of rolls of the conveyor for rotation about a vertical axis while maintaining the spaced and parallel relationship of the plurality of rolls with each other, and the turntable includes an actuator for moving the plurality of rolls axially along their associated rotational axes. Control apparatus receives the signals from the sensors and operates the roll conveyor and the turntable in response to the signals from the sensors to provide: conveyance of the glass sheet on the plurality of rolls; rotation as necessary of the turntable and the plurality of rolls supported thereon about the vertical axis; and axial movement of the plurality of rolls on the turntable as necessary to convey the glass sheet, without any sliding between the glass sheet and the plurality of rolls, to a predetermined position rotationally and laterally with respect to the direction of conveyance in preparation for further processing.

As disclosed, the control apparatus includes a computer that receives the signals from the sensors and determines the glass sheet conveyance, the turntable rotation and the axial roll movement needed to convey the glass sheet to the predetermined position. The control apparatus also includes a controller operated by the computer to control the glass sheet conveyance, the turntable rotation, and the axial roll movement to provide the conveyance of the glass sheet to the predetermined position.

The disclosed roll conveyor includes a detection section where the sensors detect the rotational position, the location along the direction of conveyance, and the lateral location with respect to the direction of conveyance of the conveyed glass sheet, and the roll conveyor also includes a positioning section where the turntable is located downstream along the direction of conveyance from the detection section. The vertical axis about which the turntable rotates is located at a central location of both the extent of the positioning section of the conveyor along the direction of conveyance and the lateral extent of the positioning section transverse to the direction of conveyance. There are three of the sensors as disclosed including: first and second sensors spaced laterally from each other with respect to the direction of conveyance to sense leading edge locations of the glass sheet; and a third sensor that senses a lateral edge location of the glass sheet. A second actuator is disclosed as moving the third sensor laterally with respect to the direction of conveyance for the sensing of the lateral edge location.

The system for positioning a hot glass sheet as disclosed further includes a vacuum platen that receives the glass sheet while in the predetermined position for the further processing. An actuator of the system disclosed is operated by the control apparatus to move the vacuum platen both horizontally along the direction of conveyance to align a design position on the vacuum platen above the conveyed glass sheet in the predetermined position and downwardly to receive the glass sheet from the conveyor. The actuator then moves the vacuum platen with the glass sheet thereon both upwardly and horizontally in a design position rotationally and laterally with respect to and positionally along the direction of conveyance for the further processing.

Another object of the invention is to provide an improved method for positioning a hot glass sheet on a roll conveyor.

In carrying out the immediately preceding object, the improved method for positioning a hot glass sheet conveys the glass sheet on a roll conveyor including horizontal rolls that have associated rotational axes extending parallel to each other and that are spaced from each other along a direction of conveyance. Sensing at least three spaced edge locations of the conveyed glass sheet as disclosed generates signals corresponding to the rotational position, the location along the direction of conveyance, and the lateral location of the glass sheet with respect to the direction of conveyance. The signals are used to rotate rolls of the roll conveyor as necessary about a vertical axis while maintaining the spaced and parallel relationship thereof with each other and to also move rolls of the conveyor axially along their rotational axes as necessary during continued conveyance of the glass sheet, without any sliding between the glass sheet and the rolls, to a predetermined position rotationally and laterally with respect to the direction of conveyance in preparation for further processing.

The sensing to generate the signals as disclosed is performed at a detection section of the conveyor, and the conveyance of the glass sheet to the predetermined position is performed at a positioning section of the conveyor downstream from the detection section. Control apparatus receives the signals from the detection section and operates the positioning section in response to the signals to provide the conveyance of the glass sheet to the predetermined position. More specifically, a computer of the control apparatus as disclosed receives the signals from the detection section of the conveyor and determines the conveyance, rotation of the rolls about the vertical axis and the axial roll movement needed at the positioning section of the conveyor for conveyance of the glass sheet to the predetermined position, and a controller of the control apparatus disclosed is operated by the computer to control the operation of the positioning section of the conveyor.

A turntable of the positioning section of the conveyor: rotates about the vertical axis; supports the rolls of the positioning section for any necessary rotational movement about the vertical axis; and supports an actuator that provides any necessary axial movement of the rolls of the positioning section to convey the glass sheet to the predetermined position.

A vacuum platen disclosed receives the glass sheet in the predetermined position from the conveyor for the further processing. More specifically, the vacuum platen is moved both horizontally along the direction of conveyance with the conveyed glass sheet in the predetermined position and downwardly to receive the glass sheet from the conveyor, and the vacuum platen is then moved with the glass sheet thereon both upwardly and horizontally along the direction of conveyance to transfer the glass sheet for the further processing.

During the sensing as disclosed, first and second sensors sense spaced leading edge locations of the glass sheet and a third sensor senses a lateral edge location of the glass sheet. Also, the third sensor as disclosed is moved laterally with respect to the direction of conveyance to sense the lateral edge location of the glass sheet.

The objects, features and advantages of the present invention are readily apparent from the following detailed description of the preferred embodiment when taken in connection with the accompanying drawings.

DETAILED DESCRIPTION

A detailed embodiment of the present invention is disclosed herein; however, it is to be understood that the disclosed embodiment is merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
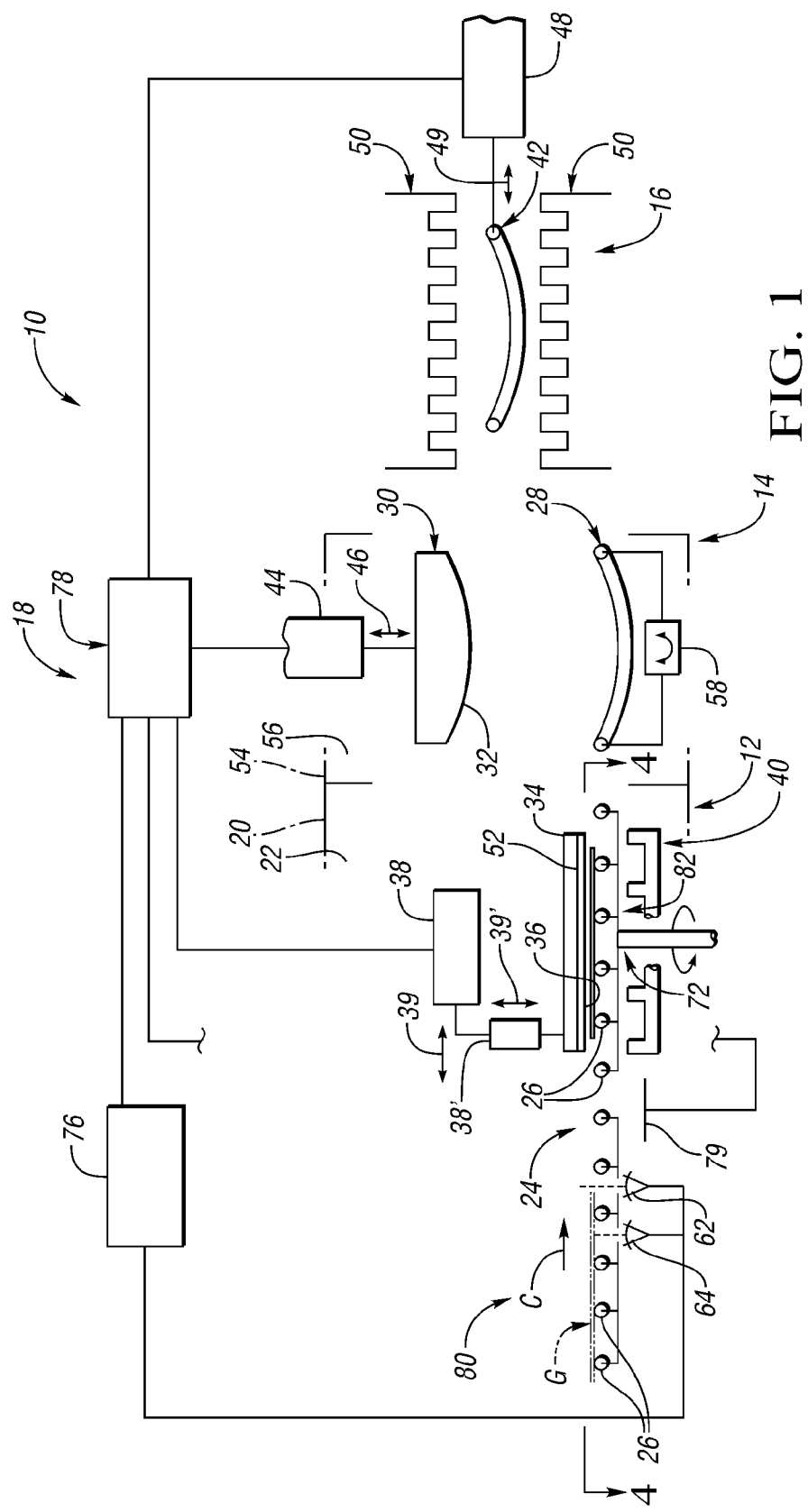
FIG. 1 is a schematic view of a glass sheet forming system that is constructed in accordance with the invention to include a roll conveyor whose method of operation also according to the invention provides hot glass sheet positioning in preparation for the forming, and the system is shown in an initial stage prior to the glass sheet forming.

With reference to FIG. 1, a glass sheet forming system 10 that embodies the present invention includes a schematically indicated furnace 12, a forming station 14, and a quench station 16 to which the formed glass sheets are delivered. Control apparatus 18 of the system coordinates the operation of the furnace 12, the forming station 14 and the quench 16. The forming system 10 of the invention and its method of operation to provide hot glass sheet positioning are hereinafter described in an integrated manner to facilitate an understanding of different aspects of the invention.

With continued reference to FIG. 1, the furnace 12 is of any conventional type including an insulated housing 20 that defines a heating chamber 22 in which a roll conveyor 24 is located. The roll conveyor 24 includes conveyor rolls 26 on which glass sheets G are conveyed at spaced intervals in a direction of conveyance as shown by arrow C for heating to a forming temperature. As is hereinafter more fully described, roll conveyor 24 provides positioning of each hot glass sheet prior to delivery from the furnace 12 to the forming station 14.

The forming station 14 of the system 10 cyclically forms heated glass sheets G as is also hereinafter more fully described. This forming station 14 includes a lower mold 28 of the ring type and an upper mold 30 having a downwardly facing surface 32 that provides a forming face at which a vacuum can be drawn as is hereinafter described.

Figure 2:
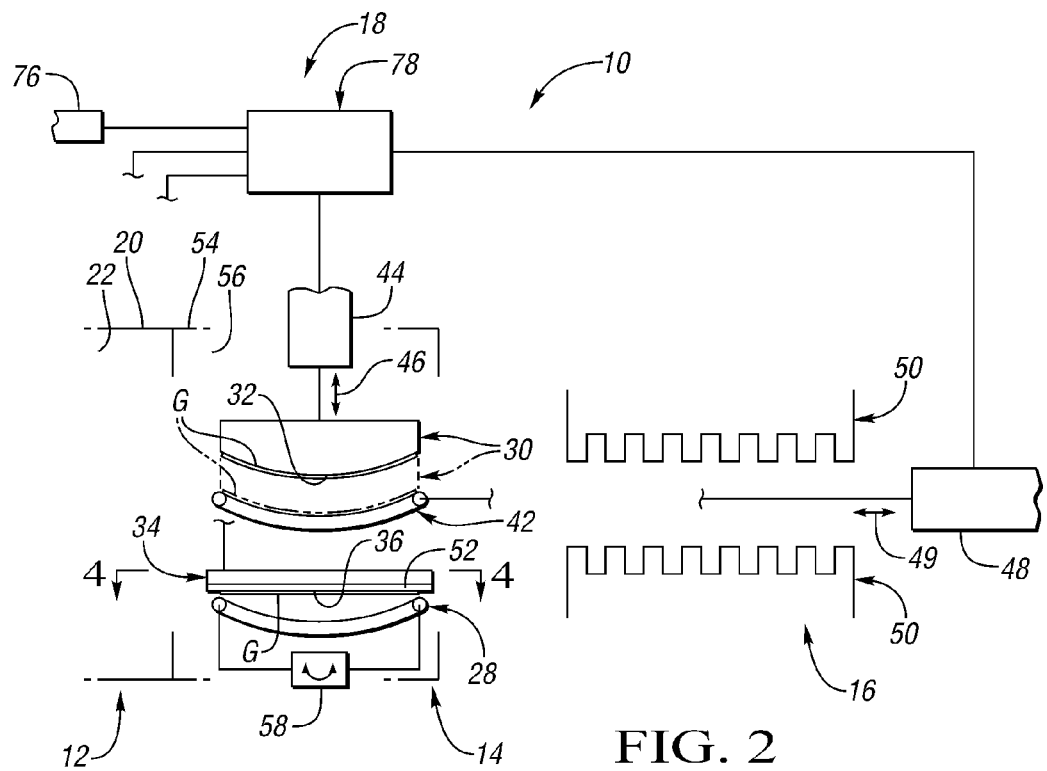
FIG. 2 is a partial view of FIG. 1 shown as one glass sheet forming cycle is almost completed and as another forming cycle is commencing.

A vacuum platen 34 of the system 10 is mounted for horizontal movement and has a downwardly facing surface 36 at which a vacuum is drawn to receive and support a heated glass sheet. An actuator 38 of the system moves the vacuum platen 34 horizontally as shown by arrows 39 between a starting position upstream of a receiving position within the furnace 12, where the glass sheet is rotationally and laterally positioned by the roll conveyor, and a delivery position within the forming station 14 as shown in FIG. 2. In the delivery position, the vacuum platen 34 is located immediately above the lower forming mold 28, and a design position on the lower surface of the vacuum platen is in vertical alignment with the design position for the glass sheet on the lower forming mold.

The vacuum platen 34 when located within the furnace 12 by actuator 38 in the receiving position of FIG. 1 receives the rotationally and laterally positioned hot glass sheet G from the conveyor by a differential gas pressure applied to the glass sheet from the vacuum platen. More specifically, as the glass sheet G and the vacuum platen move synchronously along the direction of conveyance C with the design position on the vacuum platen in continuous vertical alignment with the predetermined position of the glass sheet on the conveyor. During this synchronous movement, a vacuum is drawn at the downwardly facing surface 36 of the vacuum platen 34 and a lift jet assembly 40 can be utilized to provide an upward gas flow so that the glass sheet G is transferred upwardly from the roll conveyor 24 into supported contact with the downwardly facing surface of the vacuum platen. The actuator 38 then moves the vacuum platen 34 and the glass sheet G supported thereby from the receiving position of FIG. 1 within the furnace 12 to the delivery position of FIG. 2 within the forming station 14 above the lower mold 28 and below the upper mold 30.

Figure 3:
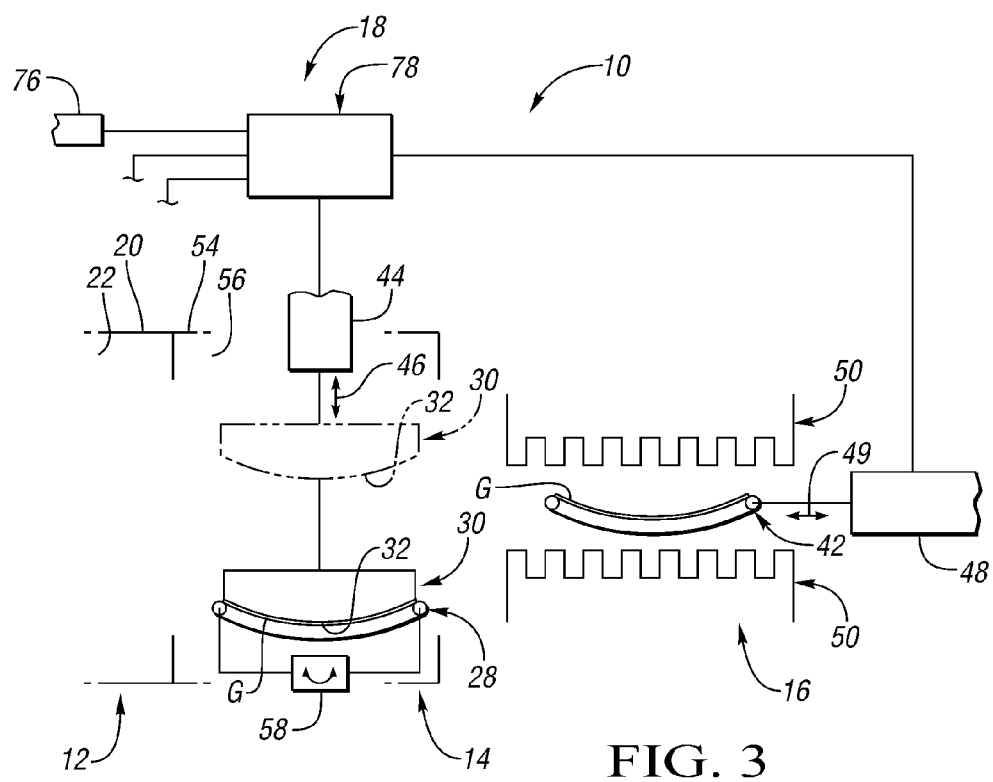
FIG. 3 is a view similar to FIG. 2 at a later stage after one glass sheet has been delivered and the following glass sheet is in the process of being formed.

The vacuum platen 34 then delivers the flat glass sheet G onto the lower mold 28 to commence the forming. Vacuum platen 34 is then moved by the actuator 38 back to a starting position upstream from the receiving position within the furnace, in preparation for its movement to the receiving position during the next cycle, and a delivery mold 42 is moved horizontally from the forming station 14 as shown in FIG. 2 to the quench station 16 as shown in FIG. 3. This movement of the delivery mold 42 delivers a previously formed glass sheet, as is hereinafter more fully described, so that the forming of the next glass sheet G can proceed as shown in FIG. 3. More specifically, another actuator 44 of the system moves the upper mold 30 upwardly and downwardly as shown by arrows 46. The upper mold 30 is moved upwardly to the position of FIG. 2 so the glass sheet can be received from the vacuum platen 34 by the lower mold 28 and is moved downwardly from the higher phantom line position of FIG. 3 to the lower solid line position to press form the glass sheet between the lower and upper molds. A vacuum is drawn at the lower surface 32 of the upper mold 30 to support the glass sheet G on the upper mold, and the actuator 44 moves the upper mold upwardly to the FIG. 2 position in preparation for delivery of the formed glass sheet and commencement of the next cycle by delivery of the next glass sheet to the lower mold as described above. The vacuum drawn at the upper mold lower surface 32 can also assist in the press forming of the glass sheet.

As shown in FIGS. 2 and 3, the delivery mold 42 is moved horizontally by a further actuator 48 as shown by arrows 49 between the forming station 14 and the quench station 16. In the forming station 14, the delivery mold 42 receives the formed glass sheet from the upper mold 30 upon reduction or complete termination of its vacuum. Furthermore, the upper mold 30 can be moved downwardly as shown by phantom line representation in FIG. 2 closer to the delivery mold 42 so that the formed glass sheet only drops a small distance as it is received by the delivery mold from the upper mold. Thereafter, the upper mold 30 is moved upwardly and the delivery mold 42 is moved from the forming station 14 to the quench station 16 between lower and upper quench heads 50 that supply quenching air for rapid cooling of the glass sheet for tempering or heat strengthening. It should be appreciated that the delivery mold can also be used to provide delivery of the formed glass sheet for annealing when annealed formed glass is to be produced.

The vacuum platen 34 has a downwardly facing surface 36 may be flat but preferably has a slight downwardly convex shape. More specifically, the downwardly facing surface 36 may have a relatively large radius of curvature such that a glass sheet having a length of about 1.5 meters will have its lateral central location displaced downwardly by about 2 centimeters from a straight line through its lateral extremities. A covering 52 of a high temperature cloth, that may be knit, woven or felt and made from fiberglass or stainless steel, is clamped at its periphery or otherwise secured to cover the downwardly facing surface 36, and this covering does not sag downwardly from the surface due to its downwardly convex shape. The slight downwardly convex shape of the transfer platen surface 36 eliminates the necessity to bond a mold covering to the platen surface and the consequent cost and fabrication time.

As shown in FIG. 1, the forming station 14 includes a schematically indicated insulated housing 54 that defines a heated forming chamber 56 that is in fluid communication with the furnace heating chamber 22. The forming station 14 may be manufactured as a separate unit whose forming chamber 56 is in fluid communication with the downstream end of the furnace housing 20 or may be manufactured as part of the downstream end of the furnace.

As shown in FIGS. 1-3, the lower mold 28 of the forming station 14 includes a tilt mechanism 58 which allows the lower mold to be tilted after receiving the heated glass sheet. Such tilting allows the glass sheet to be dropped onto the upper extremities of the lower mold with generally the same drop height at each upper extremity, and the lower mold is then tilted so that the subsequent forming and delivery mold can move the glass sheet into a quench station having curved quench heads that can be spaced closer than is possible without the glass sheet tilting from its initial attitude.

A more detailed description of the forming system is disclosed by the previously mentioned U.S. Pat. No. 7,958,750 Vild et al. and U.S. Pat. No. 8,132,428 Vild et al. whose entire disclosures have herein been incorporated by reference.

Figure 4:
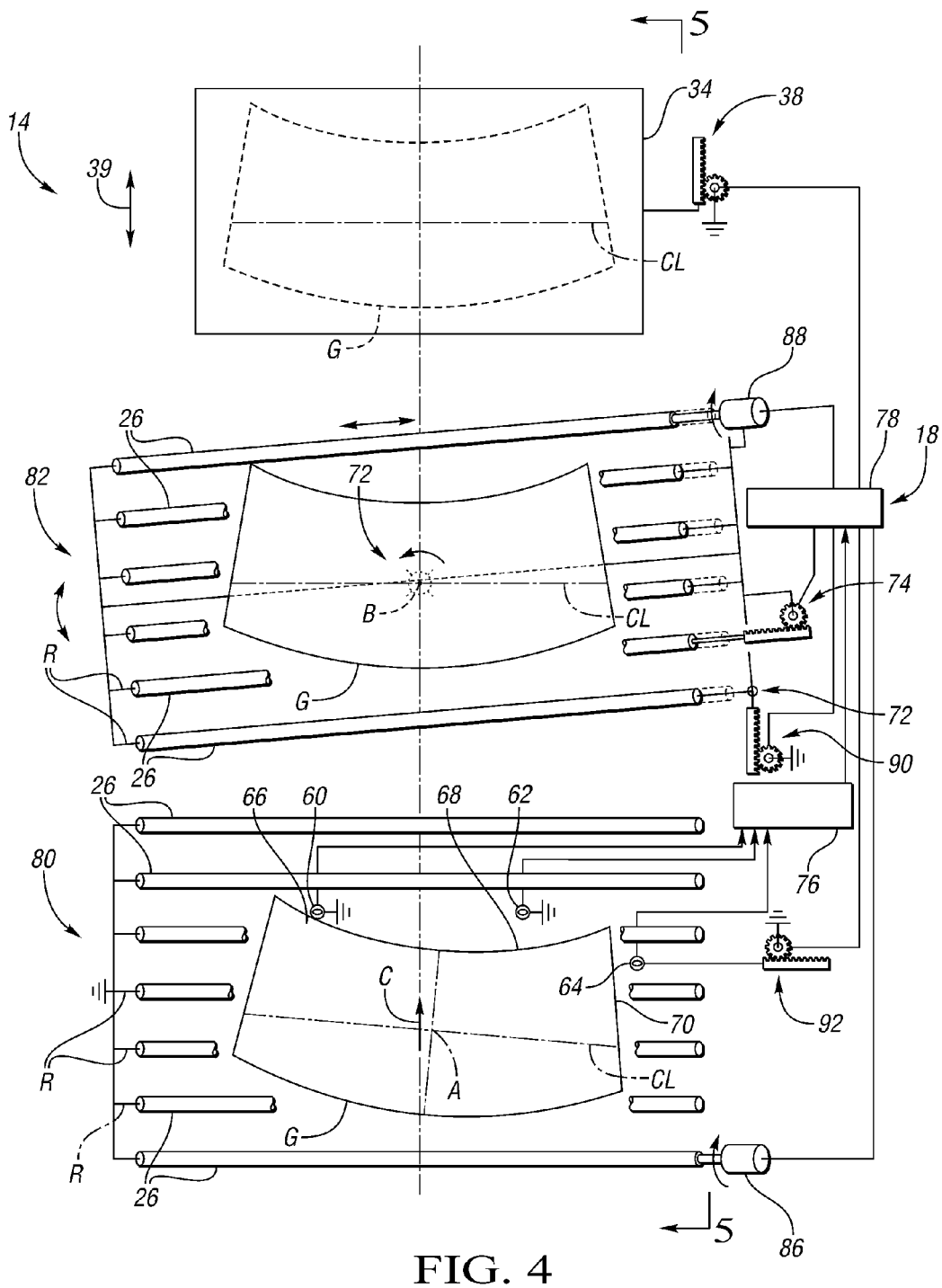
FIG. 4 is a top plan view taken partially along the direction of line 4-4 in FIG. 1 to show the roll conveyor that provides lateral and rotational positioning and partially along the direction of line 4-4 in FIG. 2 to show a vacuum platen that transfers the positioned glass sheet to a forming station for forming.

The system 10 illustrated in FIG. 1 provides positioning of each hot glass sheet G for further processing which is specifically illustrated as the forming previously described. This positioning is performed on the roll conveyor 24 which as also previously described includes horizontal rolls 26 that have associated roll axes R (FIG. 4) extending parallel to each other and that are spaced from each other along the direction of conveyance C. Sensors 60, 62 and 64 as disclosed respectively sense edge locations 66, 68 and 70 of the glass sheet to generate signals corresponding to the rotational position of the glass sheet about its center A, the location of the glass sheet along the direction of conveyance, and the lateral location of the conveyed glass sheet with respect to the direction of conveyance. Thus, as illustrated in FIG. 4, the conveyed glass sheet G is rotated clockwise from a position where its center line CL extends perpendicular to the direction of conveyance C and is also located with its center A to the right along the direction of conveyance C from the design location for further processing such as on the vacuum platen 34 previously described.

A rotatable turntable generally indicated by 72 supports a plurality of the rolls 26 of roll conveyor 24 about a vertical axis B while maintaining the spaced and parallel relationship of the plurality of rolls with respect to each other. This turntable 72 includes an actuator 74 that moves the plurality of rolls 26 on the turntable axially along their associated axes R as shown by phantom line representation in FIG. 4. The rotation of the turntable 72 about its rotational axis B moves the glass sheet toward its design rotational position and the axial movement of the rolls 26 adjusts for lateral misalignment of the center A of the glass sheet with respect to the design location for a proper positioning during the further processing provided by the forming.

The control apparatus 18 previously described receives the signals from the sensors 60, 62 and 64, through a computer 76 of the control apparatus 18 which also includes a controller 78 that is operated by the computer to control through a schematically illustrated connection 79 the roll conveyor 24, including the sensors 60, 62, 64 and the turntable 72 as well as all of the turntable components hereinafter described, so as to provide the proper glass sheet positioning. The controller 78 also operates the forming station 14 and quench station 16 in the manner previously described and will include one or more programmable logic controllers as needed to have the capability to control all of the operations involved. More specifically, this conveyor operation includes the conveyance of the hot glass sheet on the conveyor rolls 26, rotation as necessary of the turntable 72 and the rolls 26 supported thereon for rotation about the turntable vertical axis B, and the axial movement as necessary of the rolls 26 on the turntable to convey the glass sheet without any sliding between the glass sheet and the rolls to a predetermined position rotationally and laterally with respect to the direction of conveyance in preparation for the further processing performed by the forming as previously described.

The computer 76 of the control apparatus 18 has the capability of performing the calculations necessary to provide the proper rotational adjustment of the turntable 72 and lateral shifting of the rolls by the actuator 74 so that the glass sheet can be properly positioned both rotationally and laterally with respect to the direction of conveyance C. Since this computation is somewhat involved, it can be advantageously performed by an iterative process that considers the movement of the central glass location A performed by the rotation and the movement thereof performed by the axial roll shifting as is hereinafter more fully described.

Figure 5:
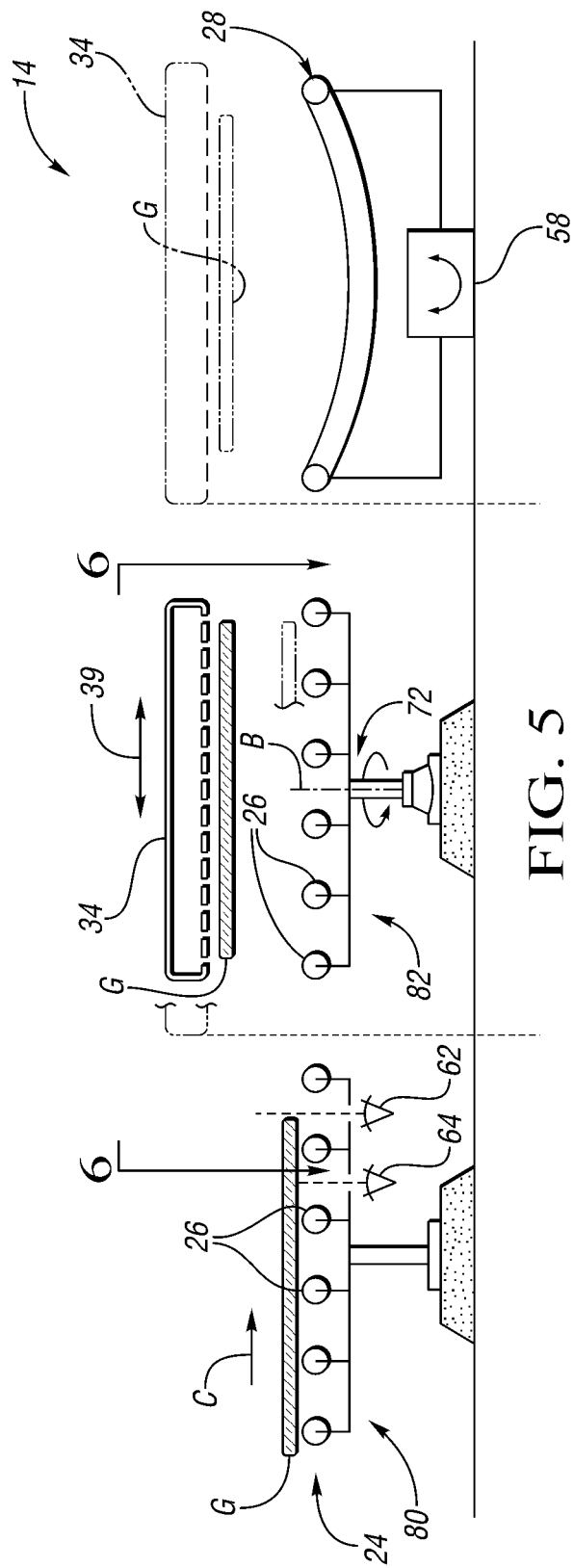
FIG. 5 is a side elevational view of the roll conveyor taken along the direction of line 5-5 in FIG. 4 and also showing the vacuum platen that provides transfer of the positioned hot glass sheet for forming.

As best illustrated in FIGS. 1, 4 and 5, the roll conveyor 24 includes a detection section 80 where the sensors 60, 62 and 64 are located to detect the rotational position, the location along the direction of conveyance, and the lateral location with respect to the direction of conveyance of the conveyed glass sheet, and the roll conveyor also includes a positioning section 82 where the turntable 72 is located downstream along the direction of conveyance C from the detection section 80. While it is possible to have the sensing and the positioning at the same section, separating the detection and the positioning permits faster operation. More specifically, after the sensing is performed at the sensing section 80, the glass sheet is conveyed to the positioning section 82 which then has its rolls 26 parallel to the rolls of the sensing section, i.e., perpendicular to the direction of conveyance C, and the positioning can be performed to the design position for the further processing by transfer to the vacuum platen 34 while the next glass sheet is being sensed. Thus, the conveyor does not have to await rotational movement and axial shifting of the rolls back to the original position after the glass sheet positioning before commencing the sensing of the next cycle when the detection and positioning portions of the conveyor are separated.

As best illustrated in FIG. 4, the vertical axis B about which the turntable 72 rotates is located at a central location of both the extent of the positioning section of the conveyor along the direction of conveyance C and the lateral extent of the positioning section transverse to the direction of conveyance. Rotation of the turntable at this central location minimizes the extent of maximum conveyor movement at its lateral extremities during the position adjustment, and the central location is within 10% of the midpoints between both the extent along the direction of conveyance and the lateral extent of the positioning section 82 of the roll conveyor. Also, the conveyance of the roll conveyor sections 80 and 82 is provided by schematically illustrated respective drive connections 86 and 88 shown in FIG. 4 while the turntable rotation is provided by an actuator 90.

With continuing reference to FIG. 4, there are three of the sensors as previously mentioned with the first and second sensors 60 and 62 spaced laterally from each other with respect to the direction of conveyance C to sense the leading edge locations 66 and 68 of the glass sheet, and with the third sensor sensing the lateral edge location 70 of the glass sheet. As disclosed, this lateral edge location is detected using an actuator 92 that moves the sensor 64 laterally during the lateral sensing. Such lateral sensor movement is advantageous when the lateral edge extends generally along the direction of conveyance with only a slight angular variation.

Figure 5A:
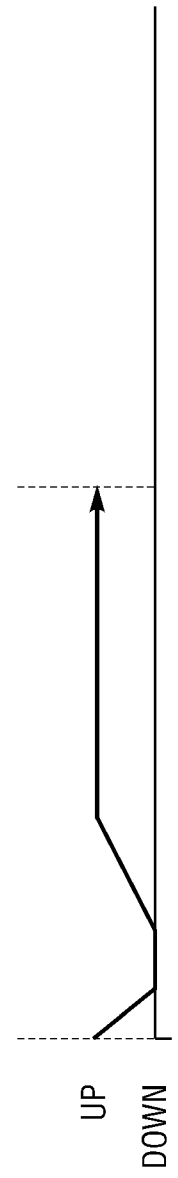
FIG. 5a is a schematic view that shows the path of travel of the trailing end of the vacuum platen when it receives a hot glass sheet that has been positioned on the roll conveyor in preparation for the forming.

The actuator 38 shown in FIG. 1 moves the vacuum platen 34 both horizontally as shown by arrows 39 and also has a portion 38' for providing vertical movement as shown by arrows 39'. This actuation as illustrated by FIG. 5a moves the vacuum platen initially horizontally and then horizontally and downwardly to receive the glass sheet and subsequently upwardly for the further horizontal movement with both downward and upward movements also having horizontal components. Such transfer of the glass sheet facilitates the accurate positioning. The upward and downward movement is about 3.7 cm and the vacuum platen is about 1.25 cm from the conveyor rolls 26 upon the glass sheet pickup from the roll conveyor.

Figure 6:
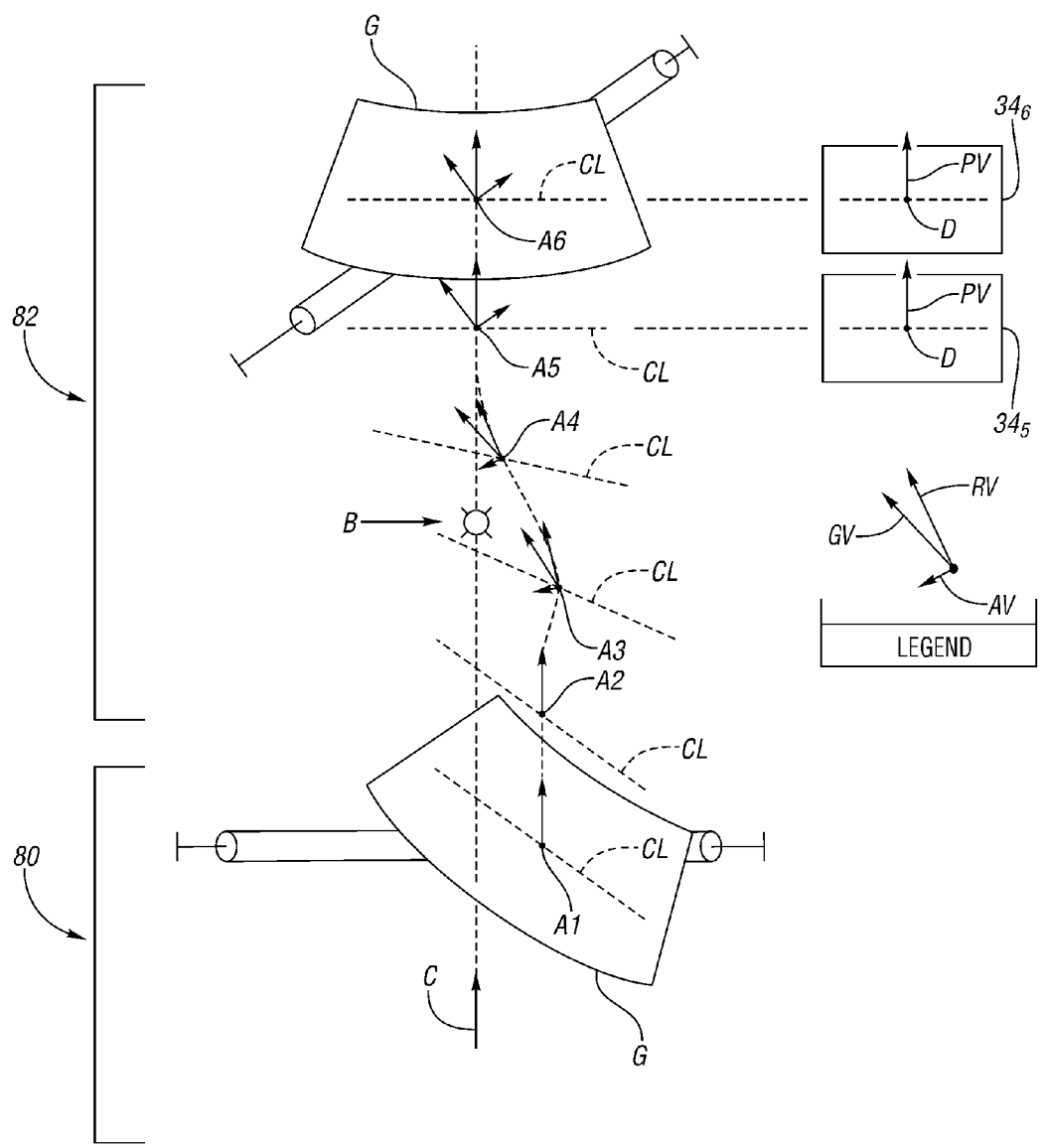
FIG. 6 is a top plan view of a positioning section of the roll conveyor taken along the direction of line 6-6 in FIG. 5.

FIG. 6 is similar to FIG. 4 but with greater exaggeration of the extent of rotation of the rolls about the turntable axis B, and it should also be mentioned that the distance along the direction of conveyance C where the adjustment takes place, which is normally only about 15 cm., is adjacent the turntable axis B. A glass sheet is illustrated with its center A in the first time step mis-positioned during the heating by rotation clockwise from and by lateral movement to the right of its design location along the direction of conveyance C. As such, the glass sheet has to be rotated counterclockwise and moved laterally toward the left along the direction of conveyance C to move to the required position for transfer to the vacuum platen 34 and subsequent positioning on the lower mold at the proper position for forming to the design shape. The legend at the right portion of FIG. 6 shows the velocity magnitude and direction GV of the center point A of the glass sheet, and its components, the velocity magnitude and direction of the rolls RV, and the velocity magnitude and direction of the axial movement of the rolls AV. At the first time step where the glass sheet center is at $A_1$, before the start of positioning, the glass sheet and the rolls have velocity of the same magnitude and direction. At the third time step, after the start of positioning, the glass sheet center has moved from point $A_2$ of the second time step to point $A_3$ even more to the right than the original mis-position, because the glass center has not yet been conveyed along the direction of conveyance C to the turntable pivot point B when the turntable starts to rotate, thus the rotation of the turntable moves the glass center to the right.

As the positioning has proceeded with the glass sheet moved through the fourth time step with its center at point $A_4$ to the fifth time step with its center at point $A_5$, the turntable has rotated the necessary amount to correct the rotation of the glass sheet and the conveyor rolls have been moved along their axes on the turntable so this axial roll movement along with the turntable rotation positions the glass center $A_5$ at a design lateral location with respect to the direction of conveyance C. Then, the velocity direction of the turntable rolls would move the glass sheet toward the left and away from the design lateral position; however, a compensating velocity of the axial movement of the rolls toward the right allows the glass sheet as a whole and its center A to continue to travel from the fifth time step to the sixth time step in the direction of conveyance at the design lateral position as well as in the design rotational position with respect to the direction of conveyance. The vacuum platen 34 is identified as $34_5$ at the fifth time step in FIG. 6 and is shown shifted, for clarity, from its actual position, which is laterally centered with respect to the direction of conveyance C to its illustrated position at the right side of FIG. 6, and the vacuum platen is likewise shown at the sixth time step and identified as $34_6$ in FIG. 6. At the fifth and sixth time steps, the actuator 38 under control of the controller 78 of FIG. 1, moves the vacuum platen at the same velocity PV as the glass sheet GV, and the controller positions a vacuum platen design position center point D directly above the center A of the glass sheet. Transfer of the glass sheet G from the roller conveyor to the vacuum platen 34 can take place at any time between the fifth and sixth time steps and the center A of the glass sheet will still be positioned at the design position center point D of the vacuum platen and also be rotationally positioned correctly as well as being at its design lateral position with respect to and correct location along the direction of conveyance for proper positioning on the lower forming mold as previously described. The allowance for time variability of the glass sheet transfer to the vacuum platen provides for time variability of the transfer without position variability of the glass sheet position on the vacuum platen along the direction of conveyance. It should be appreciated that as previously mentioned, the extent of the rotation shown in this FIG. 6 is exaggerated for purposes of illustration since the extent of rotation involved is normally less than one degree in each direction, specifically about $\frac{2}{3}°$ in each direction for a total extent of rotation of about $1\frac{1}{3}°$. The outline of the glass sheet and the outline of the vacuum platen in FIG. 6 have been greatly reduced also for purposes of illustration. The extent of travel depicted between the second and sixth time steps, which is the time during which the glass positioning and transfer to the vacuum platen occur, is normally only about 15 cm. Thus, if the glass sheet were shown in proper relative size to the 15 cm of travel, one glass sheet would cover all of the time steps and its lateral edges would not show.

The adjustment of the glass sheet can accommodate for about 10 mm difference between the leading corners of the glass sheet and for about 8 mm difference in the lateral positioning, i.e., 4 mm in each direction from the design lateral location. The direction of turntable rotation can be in either the clockwise or counterclockwise direction and can be performed with the axial movement of the rolls in either direction when needed during the rotational movement to provide the lateral adjustment as well as after the rotational and lateral adjustment to maintain the glass sheet in alignment with the moving vacuum platen for the transfer to the vacuum platen in the design position for subsequent accurate transfer to the lower mold.

The glass sheet positioning described is designed with the parameters discussed to position the hot glass sheet with its edges within less than 1 mm of the design position on the roll conveyor for the precisely located transfer to the vacuum platen and subsequently from the vacuum platen to within 1 mm of the design position on the lower mold.

While an exemplary embodiment is described above, it is not intended that this embodiment describes all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for positioning a hot glass sheet comprising:
a roll conveyor for conveying the hot glass sheet and including horizontal rolls that have associated rotational axes extending parallel to each other and that are spaced from each other along a direction of conveyance;
sensors for sensing edge locations of the glass sheet during the conveyance of the glass sheet to generate signals corresponding to the rotational position, the location along the direction of conveyance, and the lateral location of the conveyed glass sheet with respect to the direction of conveyance;
a rotatable turntable for supporting a plurality of rolls of the conveyor for rotation about a vertical axis while maintaining the spaced and parallel relationship of the plurality of rolls with each other, and the turntable including an actuator for moving the plurality of rolls axially along their associated rotational axes; and
control apparatus that receives the signals from the sensors and operates the roll conveyor and the turntable in response to the signals from the sensors to provide: conveyance of the glass sheet on the plurality of rolls; rotation as necessary of the turntable and the plurality of rolls supported thereon about the vertical axis; and axial movement of the plurality of rolls on the turntable as necessary to convey the glass sheet, without any sliding between the glass sheet and the plurality of rolls, to a predetermined position rotationally and laterally with respect to the direction of conveyance in preparation for further processing.

2. A system for positioning a hot glass sheet as in claim 1 wherein the control apparatus includes a computer that receives the signals from the sensors and determines the glass sheet conveyance, the turntable rotation and the axial roll movement needed to convey the glass sheet to the predetermined position, and the control apparatus including a controller operated by the computer to control the glass sheet conveyance, the turntable rotation, and the axial roll movement to provide the conveyance of the glass sheet to the predetermined position.

3. A system for positioning a hot glass sheet as in claim 1 wherein the roll conveyor includes a detection section where the sensors detect the rotational position, the location along the direction of conveyance, and the lateral location with respect to the direction of conveyance of the conveyed glass sheet, and the roll conveyor also including a positioning section where the turntable is located downstream along the direction of conveyance from the detection section.

4. A system for positioning a hot glass sheet as in claim 3 wherein the vertical axis about which the turntable rotates is located at a central location of both the extent of the positioning section of the conveyor along the direction of conveyance and the lateral extent of the positioning section transverse to the direction of conveyance.

5. A system for positioning a hot glass sheet as in claim 1 wherein there are three of the sensors including: first and second sensors spaced laterally from each other with respect to the direction of conveyance to sense leading edge locations of the glass sheet; and a third sensor that senses a lateral edge location of the glass sheet.

6. A system for positioning a hot glass sheet as in claim 5 further including a second actuator for moving the third sensor laterally with respect to the direction of conveyance for the sensing of the lateral edge location.

7. A system for positioning a hot glass sheet as in claim 1 further including a vacuum platen that receives the glass sheet while in the predetermined position for the further processing.

8. A system for positioning a hot glass sheet as in claim 7 further including an actuator operated by the control apparatus to move the vacuum platen both horizontally along the direction of conveyance to align a design position on the vacuum platen above the conveyed glass sheet in the predetermined position and to move the vacuum platen downwardly to receive the glass sheet from the conveyor, and the actuator then moving the vacuum platen with the glass sheet thereon both upwardly and horizontally to a design position rotationally and laterally with respect to and positionally along the direction of conveyance for the further processing.

9. A system for positioning a hot glass sheet comprising:
a roll conveyor for conveying the hot glass sheet and including horizontal rolls that have associated rotational axes extending parallel to each other and that are spaced from each other along a direction of conveyance, and the roll conveyor including a detection section and a positioning section located downstream from the detection section;
sensors at the detection section of the roll conveyor for sensing edge locations of the glass sheet during the conveyance of the glass sheet to generate signals corresponding to the rotational position, the location along the direction of conveyance, and the lateral location of the conveyed glass sheet with respect to the direction of conveyance;
a rotatable turntable at the positioning section of the roll conveyor for supporting a plurality of rolls of the conveyor for rotation about a vertical axis while maintaining the spaced and parallel relationship of the plurality of rolls with each other, and the turntable including an actuator for moving the plurality of rolls axially along their associated rotational axes;
control apparatus including a computer that receives the signals from the sensors and determines the glass sheet conveyance, the turntable rotation and the axial roll movement needed to convey the glass sheet to a predetermined position, and control apparatus also including a controller operated by the computer to control the glass sheet conveyance, the turntable rotation, and the axial roll movement to convey the glass sheet, without any sliding between the glass sheet and the plurality of rolls, to a predetermined position rotationally and laterally with respect to the direction of conveyance; and
a vacuum platen that receives the glass sheet in the predetermined position from the positioning section of the roll conveyor for movement to a forming station.

10. A method for positioning a hot glass sheet:
conveying the glass sheet on a roll conveyor including horizontal rolls that have associated rotational axes extending parallel to each other and that are spaced from each other along a direction of conveyance;
sensing at least three spaced edge locations of the conveyed glass sheet to generate signals corresponding to the rotational position, the location along the direction of conveyance, and the lateral location with respect to the direction of conveyance of the glass sheet; and
using the signals to rotate rolls of the roll conveyor as necessary about a vertical axis while maintaining the spaced and parallel relationship thereof with each other and to also move rolls of the conveyor axially along their rotational axes as necessary during continued conveyance of the glass sheet, without any sliding between the glass sheet and the rolls, to a predetermined position rotationally and laterally with respect to the direction of conveyance in preparation for further processing.

11. A method for positioning a hot glass sheet as in claim 10 wherein: the sensing to generate the signals is performed at a detection section of the conveyor; the conveyance of the glass sheet to the predetermined position is performed at a positioning section of the conveyor downstream from the detection section, and control apparatus receives the signals from the detection section and operates the positioning section in response to the signals to provide the conveyance of the glass sheet to the predetermined position.

12. A method for positioning a hot glass sheet as in claim 11 wherein: a computer of the control apparatus receives the signals from the detection section of the conveyor and determines the conveyance, rotation of the rolls about the vertical axis and the axial roll movement needed at the positioning section of the conveyor for conveyance of the glass sheet to the predetermined position; and a controller of the control apparatus is operated by the computer to control the operation of the positioning section of the conveyor.

13. A method for positioning a hot glass sheet as in claim 11 wherein a turntable of the positioning section of the conveyor: rotates about the vertical axis; supports the rolls of the positioning section for any necessary rotational movement about the vertical axis; and supports an actuator that provides any necessary axial movement of the rolls of the positioning section to convey the glass sheet to the predetermined position.

14. A method for positioning a hot glass sheet as in claim 10 wherein a vacuum platen receives the glass sheet in the predetermined position from the conveyor for the further processing.

15. A method for positioning a hot glass sheet as in claim 14 wherein the vacuum platen is moved both horizontally along the direction of conveyance to align a design position on the vacuum platen above the conveyed glass sheet in the predetermined position and downwardly to receive the glass sheet from the conveyor, and the vacuum platen is then moved with the glass sheet thereon both upwardly and horizontally to a design position rotationally and laterally with respect to and positionally along the direction of conveyance to transfer the glass sheet for the further processing.

16. A method for positioning a hot glass sheet as in claim 10 wherein first and second sensors sense spaced leading edge locations of the glass sheet and a third sensor senses a lateral edge location of the glass sheet.

17. A method for positioning a hot glass sheet as in claim 16 wherein the third sensor is moved laterally with respect to the direction of conveyance to sense the lateral edge location of the glass sheet.

18. A method for positioning a hot glass sheet:
conveying the glass sheet on a roll conveyor including horizontal rolls that have associated rotational axes extending parallel to each other and that are spaced from each other along a direction of conveyance;
sensing at a detection section of the conveyor at least three spaced edge locations of the conveyed glass sheet to generate signals corresponding to the rotational position, the location along the direction of conveyance, and the lateral location with respect to the direction of conveyance of the glass sheet;

using the signals to operate a positioning section of the conveyor downstream from the detection section to rotate rolls of the positioning section as necessary about a vertical axis while maintaining the spaced and parallel relationship thereof with each other and to also move the rolls of the positioning section axially along their rotational axes as necessary during continued conveyance of the glass sheet, without any sliding between the glass sheet and the rolls, to a predetermined position rotationally and laterally with respect to the direction of conveyance in preparation for further processing; and transferring the glass sheet in the predetermined position from the positioning section of the conveyor to a vacuum platen in connection with forming.

\* \* \* \* \*